United States Patent [19]

Radu

[11] 3,890,823
[45] June 24, 1975

[54] METHOD AND A DEVICE FOR REDUCING THE PIPE DIAMETER

[75] Inventor: Stefan I. Radu, Constanta, Romania

[73] Assignee: Intreprinderea Mecanica de Utilaje Medcidia, Judetul Constanta, Romania

[22] Filed: Mar. 15, 1973

[21] Appl. No.: 341,743

[52] U.S. Cl. .................................... 72/402; 29/237
[51] Int. Cl. ........................................... B21d 41/04
[58] Field of Search .......................... 72/402; 29/237

[56] References Cited
UNITED STATES PATENTS

| | | | |
|---|---|---|---|
| 3,037,818 | 6/1962 | Scheel | 301/124 R |
| 3,417,598 | 12/1968 | Valente | 72/402 |
| 3,568,494 | 3/1971 | Geisman | 29/237 |
| 3,740,811 | 6/1973 | Kozusnik | 29/156.4 |
| 3,750,452 | 8/1973 | Frank | 29/237 |

*Primary Examiner*—C. W. Lanham
*Assistant Examiner*—M. J. Keenan
*Attorney, Agent, or Firm*—Karl F. Ross; Herbert Dubno

[57] ABSTRACT

A method of and device for reducing the pipe diameter for tubular axles for vehicles, compressing externally successive portions of a pipe by means of clamp jaws moving radially, and having inner faces shaped according to the final shape of product. After complete shaping the clamp jaws and vise fall together to a lower level for engagement with another pipe portion. The operations are effected by means of hydraulic motors, and means to clamp and unclamp the jaws.

3 Claims, 8 Drawing Figures

PATENTED JUN 24 1975　　3,890,823

SHEET 2

METHOD AND A DEVICE FOR REDUCING THE PIPE DIAMETER

The present invention relates to a method of and a device for reducing pipe diameter, particularly for manufacturing tubular axles for use in vehicles.

There are well-known methods and devices for reducing pipe diameter, particularly for manufacturing tubular axles used in the vehicles. These methods consist in compressing the pipes externally by means of axial jaws (clamps) radially displaced by means of inclined complementary surfaces surrounding the clamps and inside guiding supports, respectively.

The drawbacks of these methods and devices are that they are of necessity provided with an insufficient number of jaws, thereby forming products whose surfaces exhibit marked folds; these techniques do not permit the formation of lengths for bearing assembly, and are also expensive and difficult to use.

The method and device according to the present invention, eliminate these drawbacks, simplify the system and yield products of good quality, because they make use of insertion in a vertical position of a tubular semi-product, with an end between shaped work clamps or jaws, which by their radial displacement, clamp the semi-product and give to it a shape corresponding to their inner face, the downward stroke of said semi-product, being achieved after a central vise operates the return of the system, when the jaws fall, together with the vise, to their initial position by their dead weight; after unclamping of the vise, the semi-product falls to a level lower than the preceeding one, for the next step enabling the complete working of each end of semi-product in a single heating. The device for applying the method is provided with a greater number of clamp jaws, comprising, as example, between eight and 24; the displacement of jaws during the downward stroke, makes use of helical springs, the displacement of clamp jaws towards the center being the result of the presence at the upper part of device, of a support sleeve, secured to the device body by means of vertical bolts. The vertical displacement of the clamps is achieved by a hydraulic motor, supplied from a distributor, operated through a mechanism with a vertical rod. The apparatus also includes a vise for centered clamping of the pipe and for centering the pipe. A centering mandrel is carried by the support plate.

The above and other objects, features and advantages of the present invention will become more readily apparent from the following description, reference being made to the accompanying drawing in which.

The method according to the invention requires the vertical insertion, in steps, by means of known handling devices, of a semi-product in form of a cylindrical pipe (tubular workpiece), into a device comprising an external body 1 having at its lower part a hydraulic motor 2. The hydraulic motor 2, is provided with a lower double-acting piston $a$, and an upper single-acting piston $b$. The piston $b$ is extended by a support plate $c$. On the support plate $c$ is located an annular array of clamp jaws 3, shaped on their inner faces in conformity to the outer form of the fabricated product.

Figure 1:
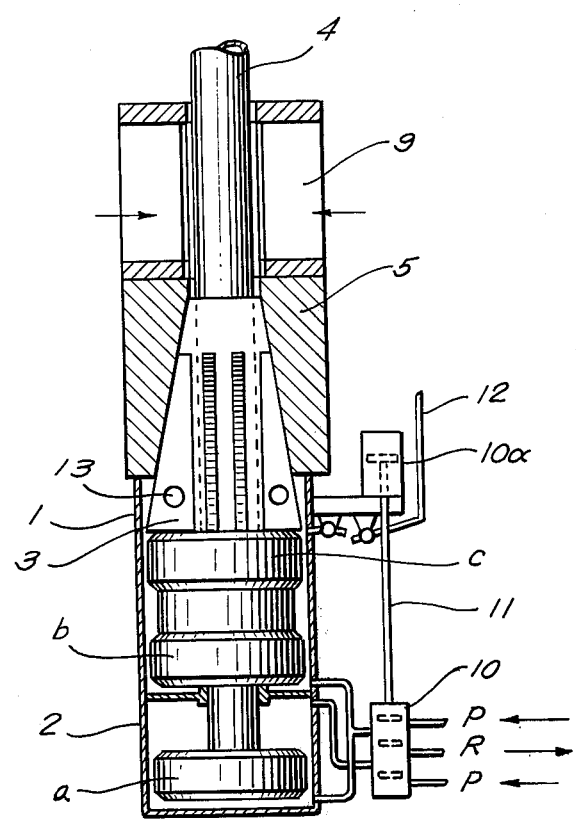
FIG. 1 is a schematic side view partly in section, of the device.
Figure 2:
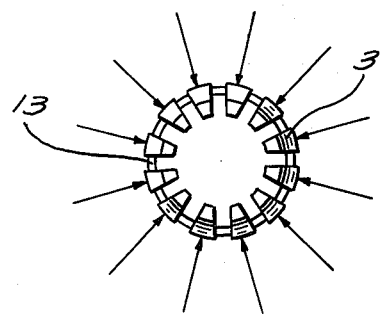
FIG. 2 is a schematic plan view of the clamp jaws.
Figure 3:
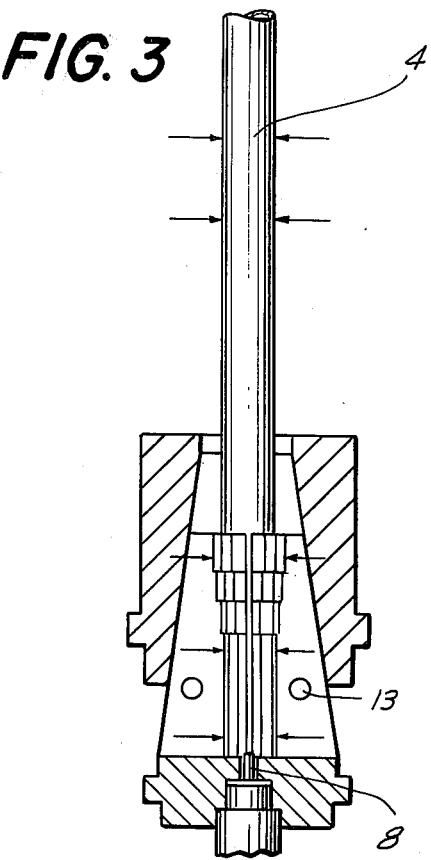
FIG. 3 is a longitudinal section through the device, with the clamp jaws lowered.
Figure 4:
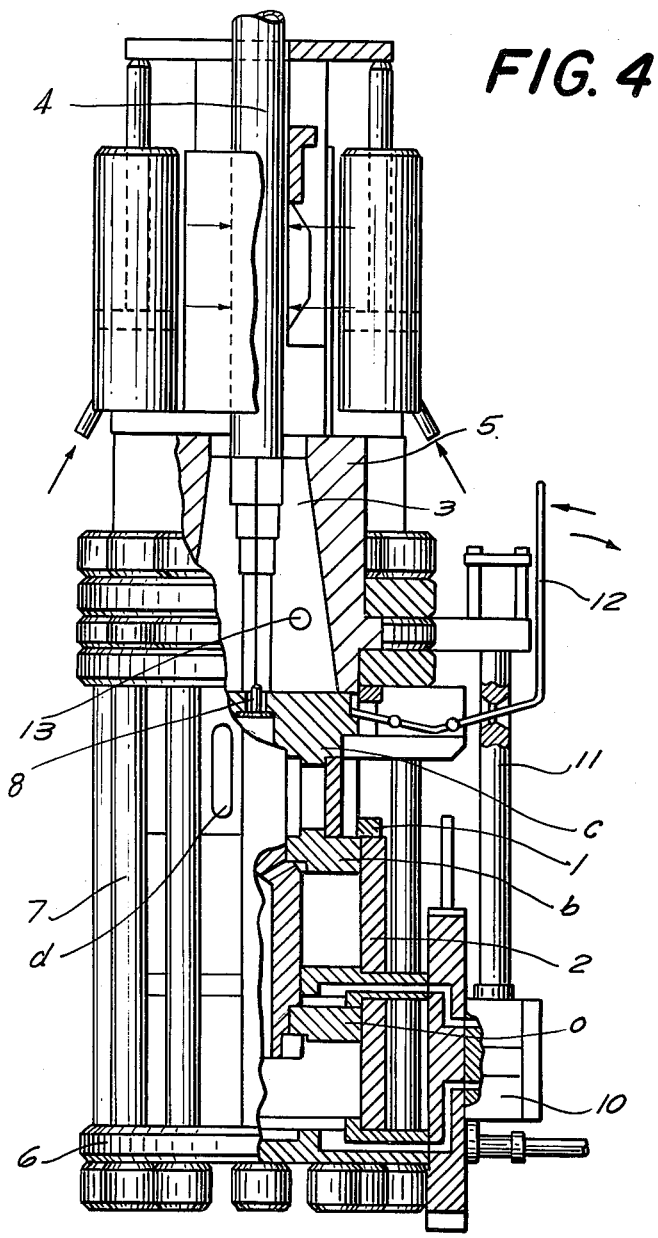
FIG. 4 is a side view, partly in section in a vertical plane.
Figure 5:
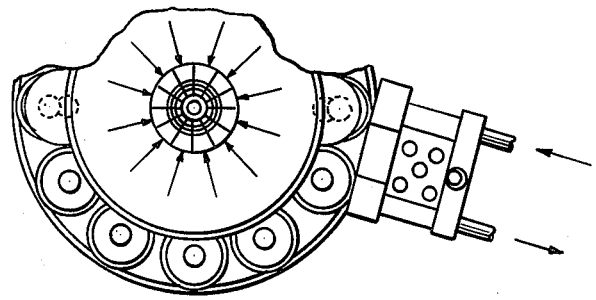
FIG. 5 is a plan view of the device of FIG. 4.

The outer surface of the array of clamp jaws corresponds to a cone with the point upwards (upwardly convergent cone segments), which is complementary to the inner surface (likewise conical) of an upper sleeve 5 secured to the device body 1 by means of horizontal rings 6 and vertical bolts 7 (FIG. 4). The support plate $c$ and the upper sleeve, 5 are traversed by channels (not shown) connected to a water network (source) for cooling these parts. For eliminating the dross between the clamp jaws 3, the body 1 is provided with radial slots $d$.

At the central part of plate $c$ there is mounted a mandrel 8 for centering or shaping the inner surface of workpiece 4. Above the sleeve 5 is mounted a vise with three extensible clamps 9 for clamping, and vertical centering and vertical displacement of the workpiece 4.

The device is provided laterally at the lower part with a slide-valve distributor 10 for driving the hydraulic motor 2. The operation distributor 10 is obtained automatically, by means of a mechanism with a vertical rod 11 and a toothed handle 12.

To spread the clamps 3 during the descent, of plate $c$, there are provide helical springs 13 between said clamps.

Figure 6:
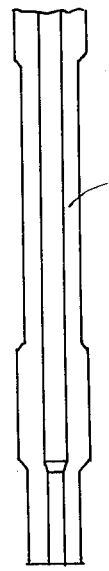
FIG. 6 is a longitudinal section through a worked semi-product.
Figure 7:
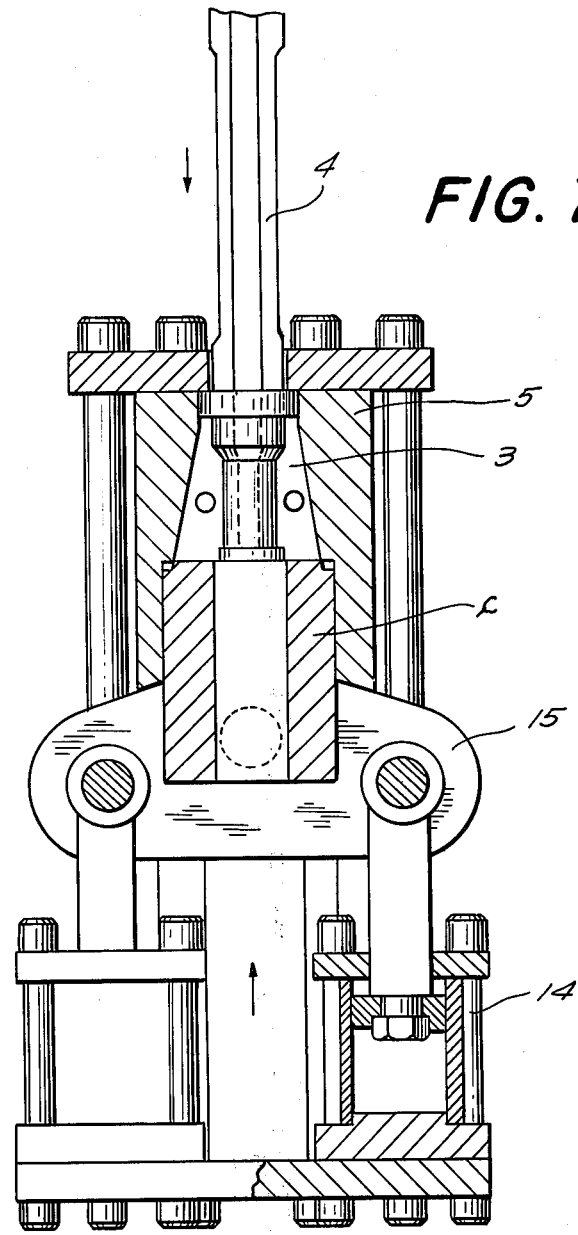
FIG. 7 is a side view partially in section through a second embodiment of an invention.
Figure 8:
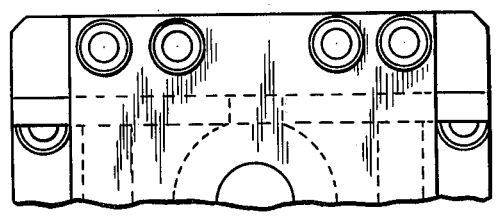
FIG. 8 is a plan view of the device in FIG. 7

In a variant embodiment according according to FIGS. 6, 7 and 8, for obtaining workpieces 4 with narrower portions on their length, the driving plate $c$ is provided with a central aperture for passing the semi-product, and the displacement is achieved by a group of two hydraulic motors or jacks 14, coupled through a traverse 15 on which is mounted the plate $c$.

The motors 14 spaced apart so as to allow the penetration of semi-product 4 therebetween.

A heated workpiece is introduced between the clamp jaws 3, then the clamp jaws are raised by the hydraulic motor 2. Simultaneously the clamp jaws 3 are moved together radially as result of the contact between the two conical surfaces on the outside of clamp jaws 3 and inside of sleeve 5.

After the completion of the raising stroke during which a length of the workpiece has been formed, there follows the descent of plate $c$, simultaneously with the spreading of clamp jaws 3 by the helical springs 13. After the descent of plate $c$, the vise 9 together with clamps 3, fall in the initial position, the vise 9 being rapidly unclamped, the workpiece falling to a lower position. The vise 9 is clamped (by conventional means) and the step of shaping a new length (portion) begins as described. The vice 9 slides vertically, together with the workpiece that it clamps and centers, then is unclamped for each descent, and clamped before each rising, or in case of cycle automation, only before and after the finishing of the whole clamping portion. It is possible to rotate around the vertical axis through a quarter of a circle, either the workpiece alone or the workpiece together with the vise, as is being imposed by the number of clamps. These steps are repeated up to the end of worked portion, after which the product is removed.

What is claimed is:

1. An apparatus for shaping a workpiece comprising:
an upright support;
a vise having radially movable clamps engageable with said workpiece in an upright position thereof for centering said workpiece on said support, said vise being vertically movable with said workpiece;
a sleeve fixed on said support and surrounding said workpiece below said vise, said sleeve having an upwardly tapering cavity;
an annular array of shaping jaws vertically shiftable on said support and receivable in said cavity, said jaws having conical segment, outer faces engageable with the wall of said cavity and stepped inner faces conforming to the configuration to be shaped in said workpiece;
a support plate carrying said array of jaws and vertically displaceable therewith;
at least one hydraulic motor mounted on said support for shifting said plate upwardly to drive said jaws into said cavity and displace said jaws vertically and radially to deform said workpiece; and
control means for selectively pressurizing said hydraulic motor with a hydraulic medium.

2. The apparatus defined in claim 1 wherein said plate is formed with a mandrel engageable in the interior of said workpiece.

3. The apparatus defined in claim 1 wherein said plate is provided with a central bore adapted to pass said workpiece and two hydraulic motors are provided flanking said workpiece for displacing said plate.

* * * * *